United States Patent [19]
McCahon et al.

[11] 3,810,612
[45] May 14, 1974

[54] METHOD AND APPARATUS FOR HANDLING SHEET MATERIALS, SIGNATURES AND THE LIKE

[75] Inventors: John O. McCahon, Simsbury, Conn.; William J. Byrne, Pearl River, N.Y.

[73] Assignee: The Smyth Manufacturing Company, Bloomfield, Conn.

[22] Filed: July 2, 1971

[21] Appl. No.: 159,394

Related U.S. Application Data

[63] Division of Ser. No. 706,926, Feb. 20, 1968, Pat. No. 3,591,165.

[52] U.S. Cl. .................................. 271/11, 271/51
[51] Int. Cl. ............................................. B65h 5/08
[58] Field of Search ............... 271/5, 11, 28, 53, 79, 271/51, 82, 85; 198/179, 180; 270/51

[56] References Cited
UNITED STATES PATENTS

| | | | |
|---|---|---|---|
| 3,502,324 | 3/1970 | Billhofer | 271/82 |
| 3,204,748 | 9/1965 | Soules | 198/179 |
| 3,544,097 | 12/1970 | Linden | 271/5 |
| 2,580,469 | 1/1952 | Schwartz | 271/51 |
| 2,703,526 | 3/1955 | Hansson | 271/85 |
| 2,861,674 | 11/1958 | Reidt | 198/180 |
| 3,371,924 | 3/1968 | Nelson | 270/53 |

FOREIGN PATENTS OR APPLICATIONS

| | | | |
|---|---|---|---|
| 965,979 | 8/1964 | Great Britain | 271/11 |

*Primary Examiner*—Richard E. Aegerter
*Attorney, Agent, or Firm*—Prutzman, Hayes, Kalb & Chilton

[57] ABSTRACT

Apparatus for feeding signatures from a stack thereof comprising means for transferring signatures one at a time from a feed hopper by rotary grippers and feed rollers to linearly traveling grippers on an endless conveyor from which the signatures are suspended to travel edgewise.

5 Claims, 10 Drawing Figures

INVENTORS
JOHN O. McCAHON
WILLIAM J. BYRNE
BY Bauer and Seymour
ATTORNEYS

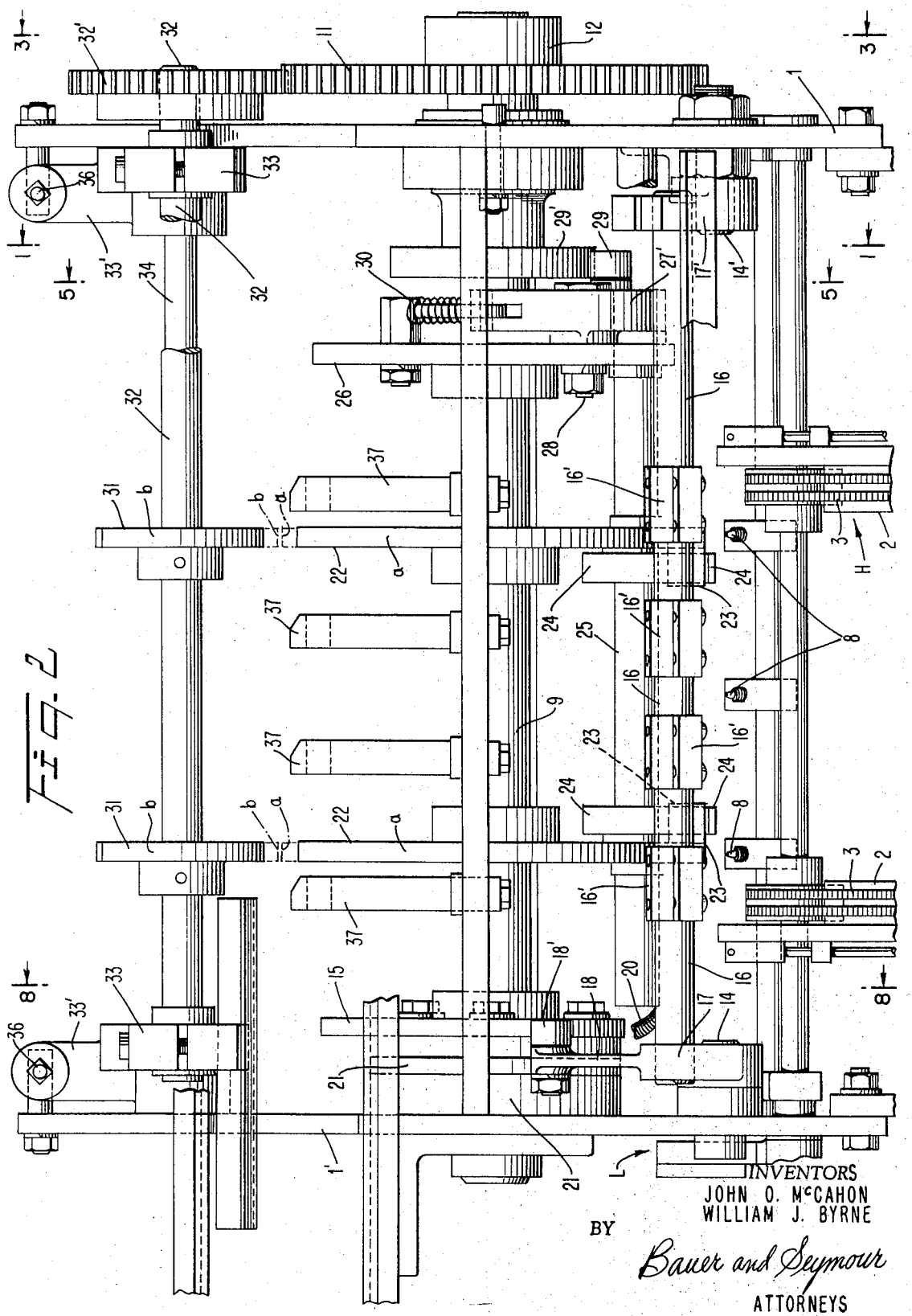

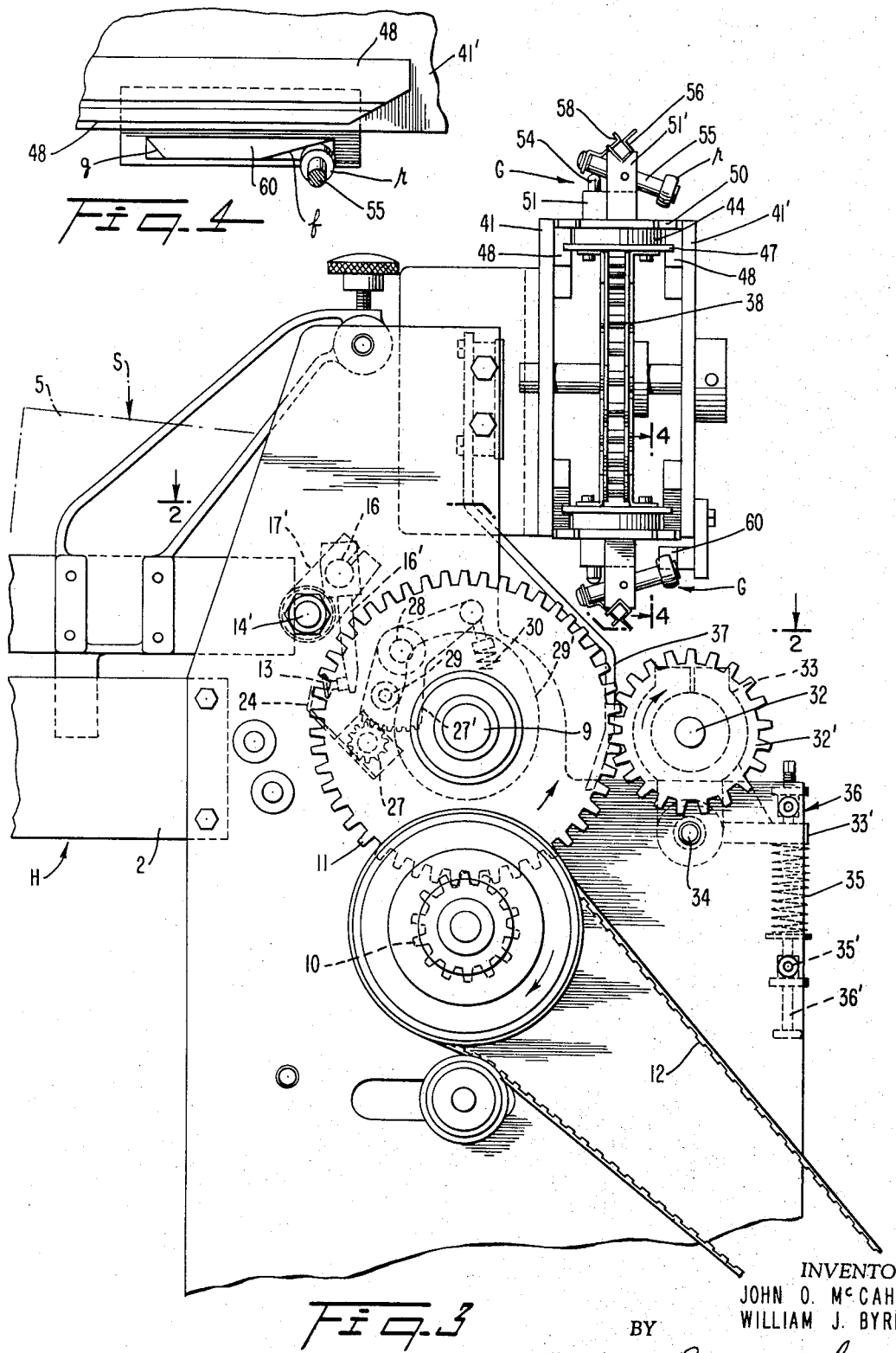

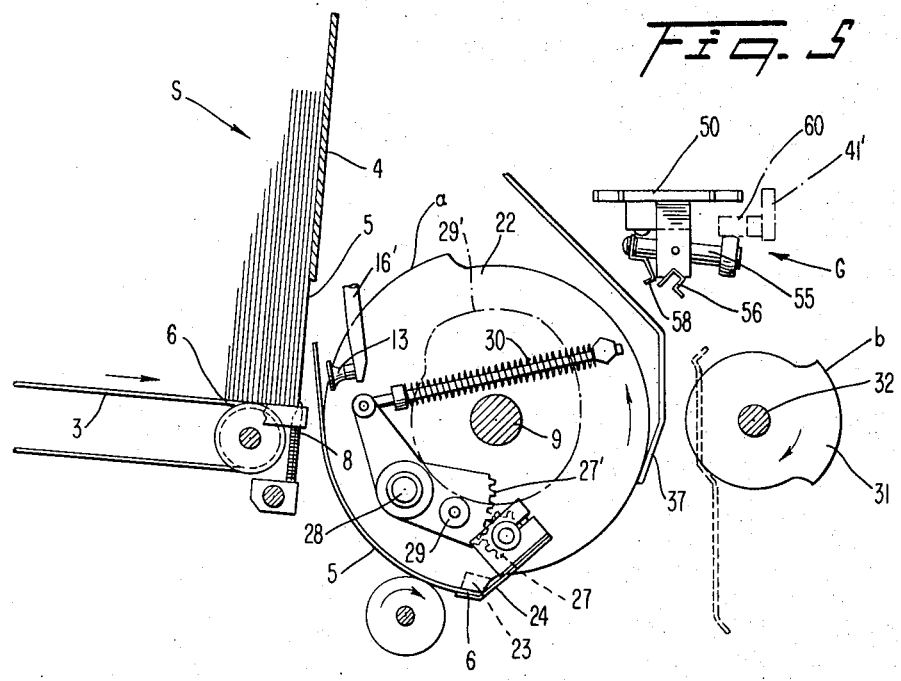
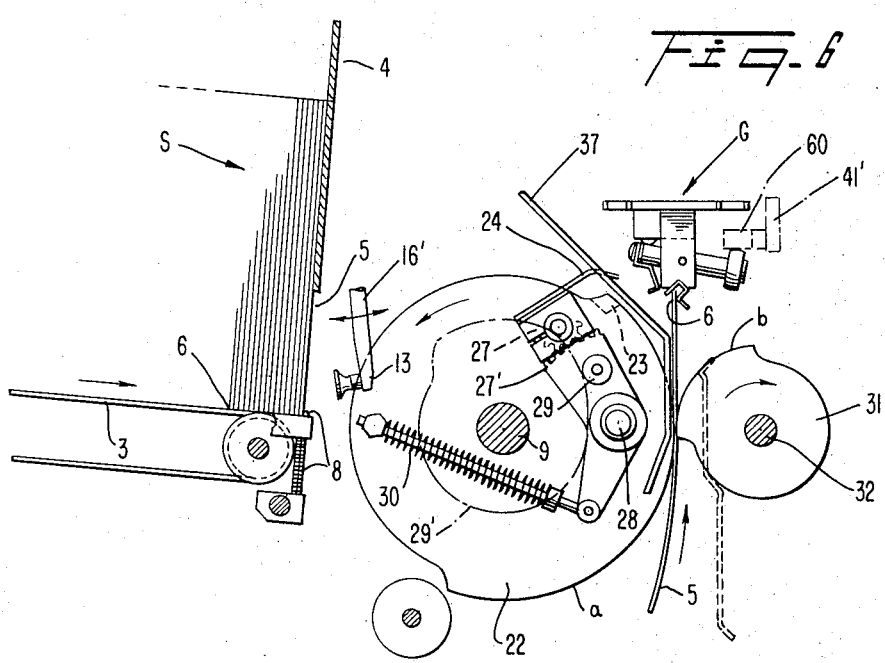

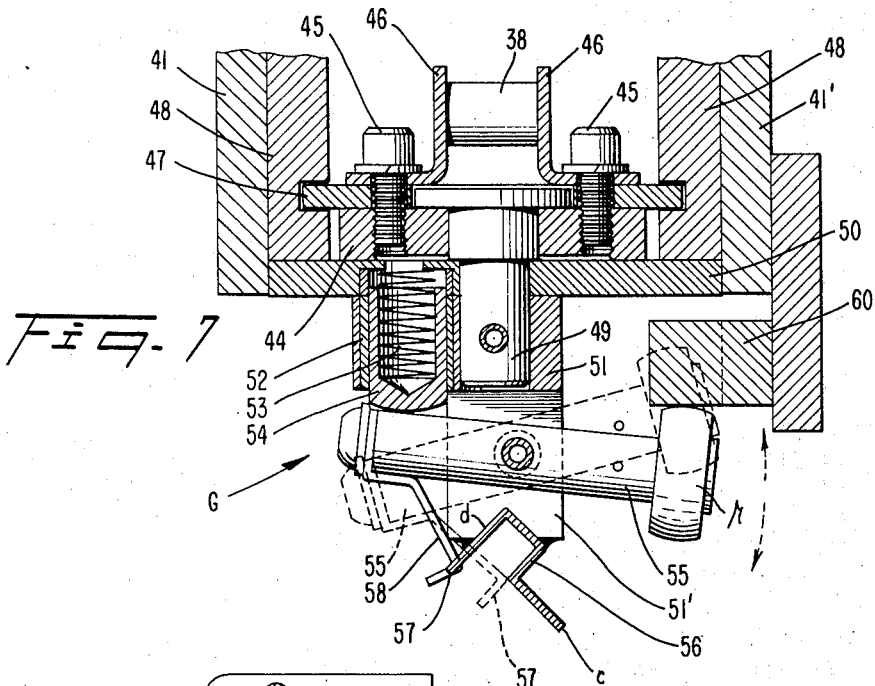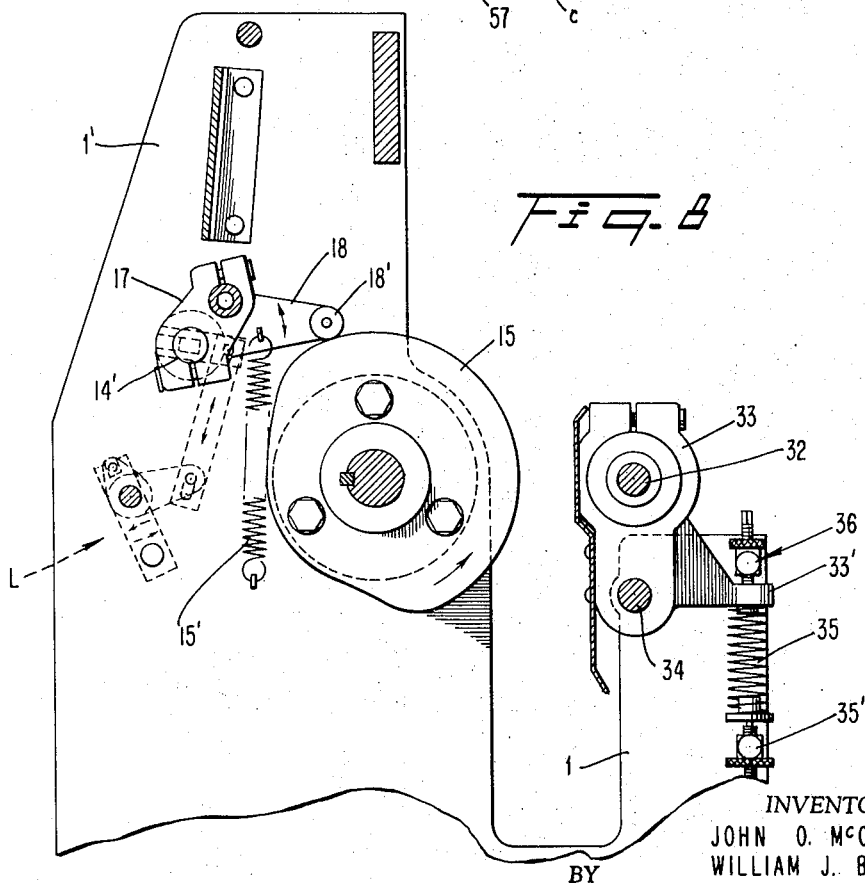

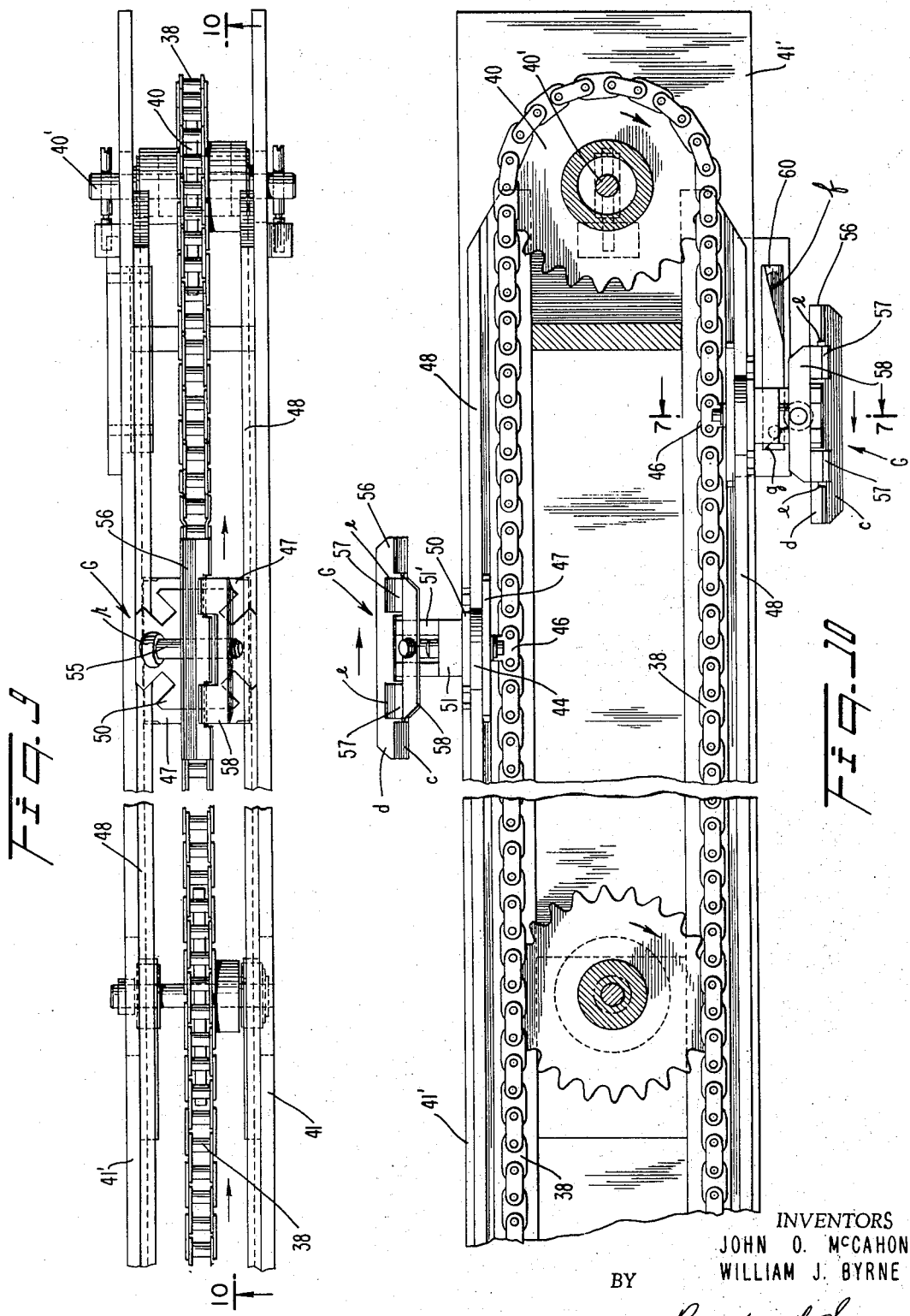

METHOD AND APPARATUS FOR HANDLING SHEET MATERIALS, SIGNATURES AND THE LIKE

This application is a division of our U.S. Pat. application Ser. No. 706,926, filed Feb. 20, 1968, U.S. Pat. Pat. No. 3,591,165 for "Method and Apparatus for Handling Sheet Material, Signatures and the Like."

The present invention relates to an apparatus for automatically handling sheet material, signatures and the like.

One of the objects of the present invention is to provide novelly constructed means for handling folded signatures in a novel manner.

Another object of the invention is to provide novel apparatus whereby folded signatures are transferred from a rotary or planetary conveyor to conveyor means for supporting the signatures in suspension and moving the same edgewise in a direction parallel to the axis of the rotary conveyor.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is an elevation view, partly in section, taken on line 1—1 of FIG. 2;

FIG. 2 is a partial top plan view of the inserter or feeder section of the apparatus taken substantially on line 2—2 of FIG. 3;

FIG. 3 is a partial end elevation view of the apparatus as seen from lines 3—3 of FIG. 2;

FIG. 4 is a detail view taken on line 4—4 of FIG. 3;

FIGS. 5 and 6 are detail views taken on line 5—5 of FIG. 2 and showing the parts in different cyclic positions following the positions thereof shown in FIG. 1;

FIG. 7 is a detail sectional view of one suitable form of signature gripping device, the section being taken on line 7—7 of FIG. 10;

FIG. 8 is a detail elevation view, partly in section, taken on line 8–7 of FIG. 2;

FIG. 9 is a top plan view with parts broken away of the input end of a gripper conveyor; and FIG. 10 is a partial front elevation view partially in section taken substantially on line 10—10 of FIG. 9.

Figure 1:
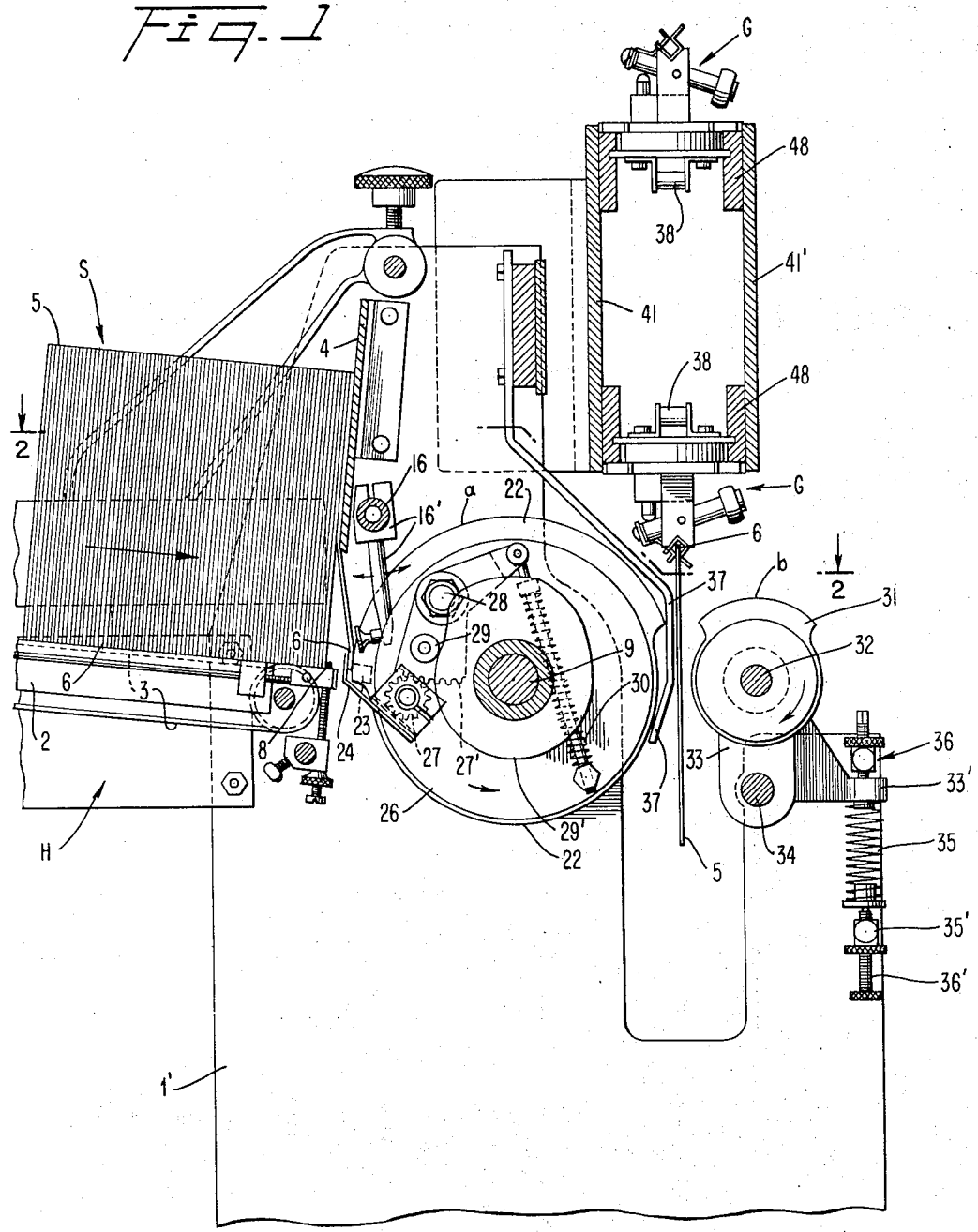

One embodiment of the novel apparatus adapted for use in practicing the invention is illustrated in FIG. 1 of the drawings. This apparatus is capable of handling closed head ring angle signatures, inserted signatures, open head signatures with front lap and a variety of other lap and no-lap signatures with or without end sheets, cutaways, tips and the like. Speaking generally, the illustrated machine as shown in FIG. 1 comprises a hopper type rotary signature feeder which transfers signatures one at a time from an on-edge stack S to an endless conveyor equipped with a series of grippers G. The signatures are transferred to and transported by the conveyor in suspended on-edge position.

The novel apparatus contemplated by the invention for handling folded signatures comprises a novel hopper type signature feeder. One form of such feeder is illustrated, by way of example, as having a supporting frame comprising end plates 1, 1' on which is mounted signature hopper H that may be of any suitable known construction. A stack S of signatures 5 is supported on-edge by slightly inclined bars 2 and endless belts 3 and rests forwardly against a plate 4 (FIG. 1). The folded backbone edges 6 of the signatures 5 in stack S are shown down in the illustrated embodiment. The bottom edge of the leading signature, at the right in stack S as viewed in FIG. 1, may engage adjustable stops 8, and as signatures are withdrawn one at a time from the forward end of the stack, the latter may be moved forwardly against stops 8 by intermittent operation of belts 3 in a manner well known in the art, such as by the cam actuated linkage L shown in FIG. 8.

Novel means are provided for withdrawing the leading signature 5 from stack S and transferring the same to the continuously operating endless gripper conveyor in suspended inverted position, i.e., with the backbone fold 6 uppermost, and the open edge portions of the signatures freely suspended from the conveyor grippers G. In the form shown, said means comprises a shaft 9 rotatably supported in plates 1, 1' and driven by suitable power means (not shown) in a counterclockwise direction, as seen in FIGS. 1 and 3, through a gear train including gears 10, 11 and timing belt 12 (FIG. 3) which is driven from a main power shaft.

In a conventional manner, the lower edge 6 of each signature in stack S is engaged and drawn to the right below plate 4 (FIG. 1) by a plurality of vacuum suckers 13 of known construction mounted on stub shafts 14, 14' for pivotal reciprocation as indicated by arrows. Timed operation of the suckers and linkage L is effected by a disc cam 15 driven by shaft 9. The suckers are carried on hollow arms 16' mounted on and projecting radially from a hollow bar 16, the ends of which are carried by arms 17, 17' pivotally mounted on said stub shafts 14, 14'. A lever 18 integral with arm 17 carries a cam follower roller 18' which is held in engagement with cam 15 by suitable resilient means, such as a spring 15' connected to lever 18 (FIGS. 2 and 8). The cups or heads of suckers 13 are connected to a source of vacuum at appropriate intervals and in timed relation with the other functions of the apparatus through hollow arms 16', hollow bar 16, a flexible hose 20, a rotary disc valve 21 concentric with and driven by shaft 9, and a flexible hose (not shown) leading from the valve to a source of vacuum, such as a motor driven pump, all in a manner well known in the art.

The lower edge 6 of a signature 5 withdrawn by vacuum suckers 13 (FIG. 1) is then engaged by mechanical or suction type gripper means carried by shaft 9 in a known manner. In the form shown, a plurality of mechanical grippers are mounted on a plurality of discs 22, 22 which may be identical and in effect constitute a drum. The discs 22 are in turn mounted on shaft 9 for rotation therewith and constructed to perform a dual function. Said gripper means comprises blocks 23 mounted on drum discs 22 near the periphery thereof and having arcuate gripping surfaces that form lateral extensions of the peripheral or rim surfaces of the discs for cooperation with gripper fingers 24 fixedly mounted on a shaft 25 that is eccentrically journalled in discs 22 and a disc 26 on shaft 9 for angular reciprocation relative thereto. A pinion 27 on one end of shaft 25 meshes with a gear segment 27' which forms one arm of a bell crank pivotally mounted at 28 on disc 26 which rotates with shaft 9. The gear segment 27' carries a roller 29 which is held in engagement with a cam 29' by a compression spring 30 connected to the other arm of the bell crank, said cam being secured to frame 1. Thus, at the proper time in the cycle of counter-clockwise rotation of drum 22, 22, as viewed in FIGS. 1, 5 and 6, gripper fingers 24 are moved into cooperative relation with blocks 23 to grip the lower edge 6 of a signature 5 which, as described above, has been segregated from the stack S by suckers 13 (FIG. 1). Upon continued rotation of drum 22, 22 the gripped signature is withdrawn downwardly from the stack and carried in an arcuate path by the drum (FIG. 5).

In addition to carrying gripper means 23, 24 for removing and conveying signatures from stack S, the drum 22, 22 cooperates with a sector drum 31 to provide a friction or roll type sheet or signature feeder to which signatures are delivered by said gripper means. In the form illustrated, sector drum 31 also consists of a plurality of discs which mate with the discs of the first drum 22, 22. As shown, the latter may also be a sector drum; that is, a drum having only a sectoral rim or peripheral surface of maximum diameter. Drum 31 comprises two identical sector discs mounted on a shaft 32 for rotation therewith. Said shaft is parallel to shaft 9 and is preferably driven by a gear 32' which is in constant mesh with drive gear 11 on shaft 9, whereby drums 22 and 31 are driven in opposite directions as indicated by arrows in FIG. 5.

Shaft 32 is journalled near its ends in corresponding arms 33 of bell cranks 33, 33' which are pivoted on a transverse cross bar 34 between the main frame plates 1, 1'. The bell cranks 33, 33' are resiliently urged in a counterclockwise direction as viewed in FIGS. 3 and 8 by compression springs 35 interposed between the arms 33' of the bell cranks and fixed brackets 35'. Said springs urge arms 33' against adjustable stops 36 which determine the minimum clearance between the sectoral rim surfaces a and b of drums 22 and 31, respectively. Suitable known means including a threaded member 36' may be provided for adjusting the compression of each spring 35 and thereby the pressure applied to a signature gripped between the sectoral surfaces a and b of the cooperating drum discs 22 and 31.

The sectoral rims a and b of sector drums 22 and 31 may but need not be of equal radius. The rotational velocities of the two drums are, however, so chosen that the sectoral surfaces thereof are face-to-face when passing through the plane containing the drum axes (FIG. 6) at the same time to bite or grip a signature 5 therebetween under the pressure of springs 35 and to thus frictionally feed the signature upwardly. The relative speeds of rotation of the two drums 22 and 31, as determined by the diameters of drive gears 11 and 32, are such that the linear speed of the sectoral rim surfaces a and b which engage opposite sides of the signatures are substantially equal.

Thus, when the leading edge 6 of a signature 5 engaged by gripper means 23, 24 has been moved from the position illustrated in FIG. 5 to the plane containing the parallel axes of shafts 9 and 32, the adjacent sectoral surfaces a and b will cooperate to bite and frictionally grip the edge 6 of the signature while at about the same time, cam 29' will operate to actuate gripper fingers 24 to open position (FIG. 6) and thus release said edge of the signature. Following such release the signature is fed upwardly by drums 22 and 31 and is preferably guided by a plurality of stationary depending bars 37 in inverted position from that which it occupied in the hopper H. The now upper edge 6 of the signature, which may be the backbone fold thereof, is directed into one of a plurality of gripper mechanisms G of the endless conveyor to be next described. Each gripper G, as it passes above drums 22 and 31, is moving continuously and horizontally away from or toward the reader (FIG. 1) in a line parallel to the axes of said drums and perpendicular to the direction in which the signature is being fed by said drums. The timing of the cooperating mechanisms is such that an open gripper G receives the leading edge of the signature and closes to support and convey the same in suspended position (FIG. 1) at the same time that the signature is released from the grip of drums 22 and 31; that is, when the trailing end of at least one of the sectoral rim surfaces a and b moves above the plane containing the axes of said drums, thereby freeing the signature for movement in a line parallel to said axes. The discs making up drum 31, 31 are preferably angularly adjustable on shaft 32 for varying and hence, timing the release of signatures from the bite of drums or rolls 22 and 31.

It will be understood that the stops 36 are so adjusted that the minimum distance between sectoral surfaces a and b when they are face to face between shafts 9 and 32, is somewhat less than the thickness of the thinnest sheet or signature to be handled. Thus, each signature fed into the bite of the drums 22 and 31 will force drum 31 away from drum 22 against the pressure exerted by springs 35 to thereby provide the necessary biting or gripping action for feeding the signatures upward. If desired, the timed release of a signature from the bite of drums 22 and 31 may be effected by suitable cam or eccentric means (not shown) for periodically further pivoting bell cranks 33, 33' and hence, drum 31 clockwise (FIG. 1) about rod 34 and away from drum 22 against the pressure of springs 35. Although it is preferable that drum 31 be positively driven as illustrated, the same may be an idler drum, if desired, since drum 22 is positively driven. In the illustrated embodiment, the diameter of drum 31 is only half that of drum 22. Hence, drum 31 is driven at twice the angular speed of drum 22 and accordingly, makes a lost revolution while gripper means 23, 24 returns to position for withdrawing another signature from the hopper.

The endless gripper conveyor is of novel construction and in the form shown comprises a single endless belt or chain 38 supported primarily by a driving sprocket (not shown) and an idler sprocket 40 mounted on a horizontal shaft 40' journalled in parallel beams or rails 41 and 41'. Conveyor chain 38 is continuously driven in a clockwise direction as viewed in FIG. 10 in timed relation with the hopper feeder and other associated mechanism. Chain 38 may be driven from a main power shaft through a timing belt, suitable gears and an overload clutch.

Chain 38 carries a plurality of equally spaced novelly constructed signature gripping devices G including signature clamps preferably capable of pivoting or rotating relative to the chain. In the form illustrated each gripper mechanism, the details of which are shown in FIG. 7, is rotatably supported by a swivel plate 44 secured by stud bolts 45 to ears extending laterally from special links 46 of the chain. Plate 44 is spaced from said ears by a thin flat plate 47, the edges of which ride in grooves in elongated bars 48 secured to the inner adjacent faces of beams 41, 41' (FIG. 3) near the upper and lower edges thereof. The guide plates 47 and bars 48 thus serve to provide support for the upper and lower reaches of chain 38 to prevent sagging thereof. A pivot pin 49 is journalled in an opening in swivel plate 44 and has a flange or enlarged head which rests on the swivel plate within a hole through guide plate 47. Mounted on the reduced projecting end of pin 49 for rotation therewith is a generally square Geneva gear plate 50 having bevelled corners and radial corner slots (FIG. 9) and a bifurcated body member 51 (FIG. 7) secured to the pin by any suitable means such as a transverse dowel. Plate 50 and member 51 are linked together by tube 52 which provides a recess for a compression spring 53 and a plunger 54 urged outwardly by the spring.

The outer end of spring pressed plunger 54 engages a clamp bar 55 pivotally mounted between the furcations 51' of member 51 and is effective to normally hold said bar in the dotted line position shown in FIG. 7. A generally channel-shaped gripper jaw 56 is suitably secured, such as by welding, across the outer ends of the body member furcations 51'. When a gripper mechanism G is suspended from the lower reach of chain 38, the jaw 56 forms in effect an inverted V with an inclined skirt $c$ to guide and receive the upper edge 6 of a signature 5 that is fed upwardly by drums 22 and 31 in the manner above described. The inclined side $d$ of jaw 56 has a plurality of slots $e$ (FIG. 10) to receive the angle shaped fingers 57 of a cooperating clamping jaw 58 mounted on one end of bar 55. A cam follower roller $r$ is mounted on the other end of bar 55 for engagement with a cam bar 60 adjustably mounted on the lower edge of beam 41' (FIGS. 4 and 10).

When a clamping or gripping device G approaches the bottom of sprocket 40, the guide plate 47 thereof enters the grooves in lower bars 48 and roller $r$ engages the inclined surface $f$ of cam bar 60 (FIG. 4) to thereby pivot bar 55 and clamp jaw 58 to the full line position in FIG. 7 with the jaws 56 and 58 separated for receiving the edge 6 of an upwardly fed signature 5. When the roller $r$ rides off the more sharply inclined surface $g$ of the cam bar 60, the clamping jaws are rapidly moved to dotted line position (FIG. 7) and hence, closed on the signature by spring plunger 54. At the same time the signature is released, as above described, by rolls or drums 22, 31 to permit movement of the signature toward the left (FIG. 10) by the gripper conveyor while suspended from the gripper device G. While the suspended signature is being thus continuously horizontally advanced, the same may be automatically opened to its center in a manner fully described in the above-mentioned parent application, the entire disclosure of which is incorporated herein by reference.

In summary the apparatus contemplated by the invention operates through suction means 13 and rotary grippers 23, 24 on continuously rotating drums 22 to withdraw signatures downwardly one at a time from a stack S of signatures stacked on edge in a predetermined repetitive sequence. After being carried approximately a half revolution by drums 22, each signature is released by grippers 23, 24 to be roll fed upwardly by cooperating sectoral surfaces $a$ and $b$ on drums 22 and 31 and into linearly traveling grippers G. Suspended from these grippers, the signatures are carried horizontally in predetermined spaced relation for processing by other associated apparatus.

There is thus provided novel apparatus of simplified construction for automatically feeding signatures in a substantially continuously moving stream from a stack of signatures and transferring said signatures from a continuously operating rotary or planetary conveyor to a continuously operating endless linear conveyor from which the same are suspended while being linearly conveyed.

What is claimed is:

1. In apparatus adapted for feeding signatures and the like from a hopper supporting a stack of signatures on edge, a first rotatable drum, means for rotatably driving said drum, a second rotatable drum cooperable with said first drum for feeding signatures therebetween, continuously moving signature conveyor means including first gripper means movable in a plane parallel to the axes of said drums, means including second releasable gripper means mounted on said first drum to grip the bottom edge of a signature at the periphery of the first drum as the latter rotates for withdrawing the signature downwardly from said stack and delivering and releasing the same in inverted position to the bite of said drums to be thereby roll-fed upwardly, and released by the drums to said first gripper means.

2. Apparatus for feeding signatures and the like comprising a first drum, means for rotatably driving said drum, a second drum rotatably mounted adjacent and resiliently urged toward said first drum whereby to yieldably bite and roll-feed signatures therebetween in a first direction, means mounted on said first drum for engaging a signature and carrying the same into and releasing the same to the bite of said drums, a conveyor comprising gripper means for receiving and gripping the leading edge of a signature roll-fed and released thereto by said drums while moving in a second direction perpendicular to said first direction, and means for rendering said gripper means operative to grip a signature simultaneously with the release thereof by said drums.

3. Apparatus for handling sheet material comprising a first rotatable drum, a second rotatable drum adjacent to and cooperable with said first drum to grip and frictionally feed sheets edgewise in a plane, gripper means revolvable with said first drum for conveying sheets edgewise in a path corresponding generally with the outer peripheral surface of said first drum and into the bite of said drums, means for opening the gripper means to release the sheet when the latter is gripped between said drums, and endless conveyor means including gripper means for receiving the leading edge of sheets fed by said drums and conveying the same edgewise in said plane in a direction normal to the direction in which the sheets are fed by said drums.

4. Apparatus as defined in claim 3 wherein the outermost peripheral surface of at least one of said drums is sectoral, whereby the sheets are released from the bite of said drums when the sheets are gripped by the gripper means of the conveyor means.

5. Apparatus as defined in claim 3 comprising means for continuously driving said rotatable drums and said conveyor means in predetermined timed relation with each other.

* * * * *